(12) United States Patent
Ouyang et al.

(10) Patent No.: US 8,297,756 B2
(45) Date of Patent: Oct. 30, 2012

(54) ILLUMINATION DEVICE

(76) Inventors: Chieh Ouyang, Taipei County (TW);
Wei Ouyang, Taipei County (TW)

( * ) Notice: Subject to any disclaimer, the term of this patent is extended or adjusted under 35 U.S.C. 154(b) by 239 days.

(21) Appl. No.: 12/782,748

(22) Filed: May 19, 2010

(65) Prior Publication Data

US 2010/0296066 A1    Nov. 25, 2010

(30) Foreign Application Priority Data

May 20, 2009 (TW) ............................... 98116634 A

(51) Int. Cl.
*G03B 21/00* (2006.01)

(52) U.S. Cl. ..................... 353/43; 353/101; 362/187

(58) Field of Classification Search ............... 353/30, 353/31, 33, 34, 37, 42, 43, 81, 85, 94, 97, 353/101, 119, 122; 359/290–292, 226.1, 359/619, 625, 627, 630, 631, 633, 666, 458, 359/500, 501, 465, 489, 492, 502; 362/187, 362/202, 208, 109, 268, 280, 281, 319, 323, 362/287, 427

See application file for complete search history.

(56) References Cited

U.S. PATENT DOCUMENTS

| | | | |
|---|---|---|---|
| 6,585,391 B1* | 7/2003 | Koch et al. | 362/205 |
| 6,616,296 B1* | 9/2003 | Roux et al. | 362/184 |
| 6,746,124 B2* | 6/2004 | Fischer et al. | 353/43 |
| 6,893,143 B2* | 5/2005 | Opolka | 362/241 |
| 6,991,336 B2* | 1/2006 | Matsui | 353/94 |
| 7,083,299 B2* | 8/2006 | Chapman | 362/188 |
| 7,118,221 B2* | 10/2006 | Shimada | 353/31 |
| 7,147,345 B1* | 12/2006 | Toney, Jr. | 362/208 |
| 7,480,099 B2* | 1/2009 | Raber | 359/626 |
| 7,787,188 B2* | 8/2010 | Goto | 359/629 |
| 2001/0043313 A1* | 11/2001 | Okura | 353/97 |
| 2004/0170014 A1* | 9/2004 | Pritchard et al. | 362/202 |
| 2008/0068833 A1* | 3/2008 | Shiau | 362/187 |
| 2008/0316736 A1* | 12/2008 | Hunnewell et al. | 362/187 |
| 2010/0277696 A1* | 11/2010 | Huebner | 352/81 |

* cited by examiner

*Primary Examiner* — William C Dowling
*Assistant Examiner* — Sultan Chowdhury
(74) *Attorney, Agent, or Firm* — Rosenberg, Klein & Lee

(57) ABSTRACT

An illumination device is including an illumination body and a hollow sleeve. A light emitting element and a transparent sheet is disposed in the illumination body. A first convex lens is disposed in the hollow sleeve. The light emitting element, the transparent sheet, and the first convex lens are arranged sequentially along a moving direction. When the hollow sleeve is operated to move along the moving direction, the first convex lens is moved with respect to the light emitting element and the transparent sheet, and the projection facula is changed from presenting a light source pattern of the light emitting element to a predetermined pattern of transparent sheet.

11 Claims, 17 Drawing Sheets

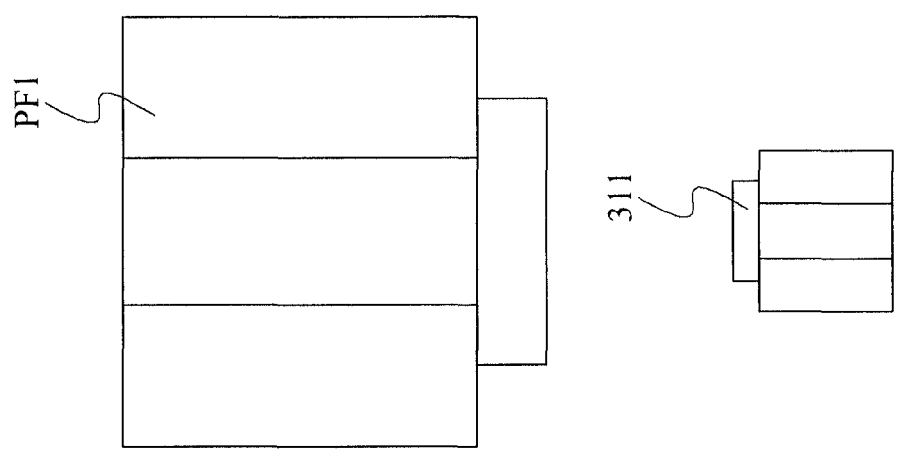

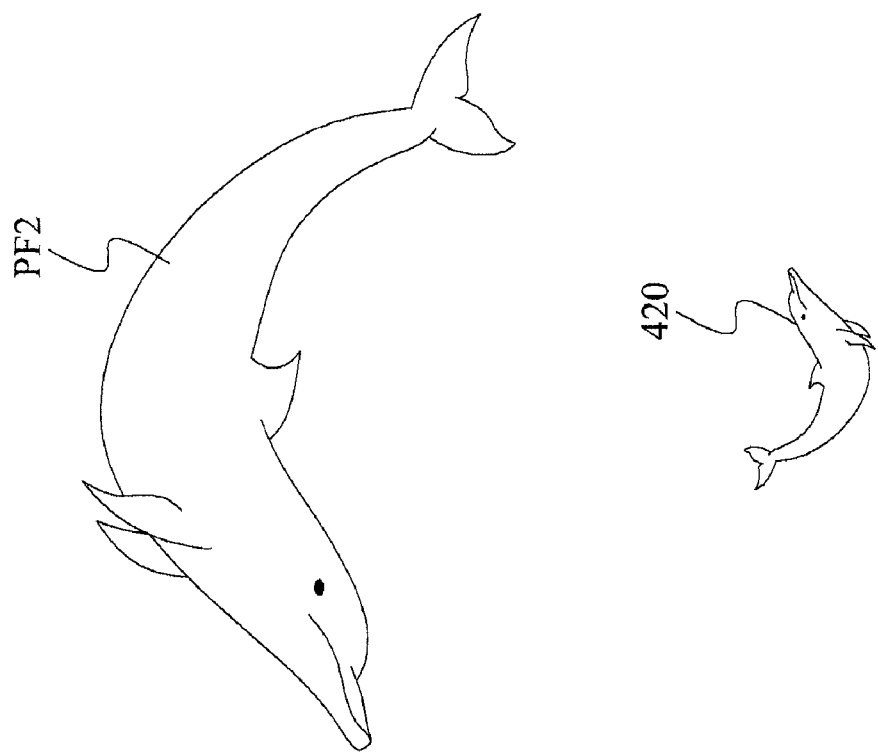

ILLUMINATION DEVICE

This application claims the benefit of Taiwan Patent Application Serial No. 098116634, filed on May 20, 2009, the subject matter of which is incorporated herein by reference.

FIELD OF THE INVENTION

The present invention relates to an illumination device, and particularly relates to an illumination device capable of selectively projecting a projection facula onto the surface of an objective for illumination and presenting a predetermined pattern by moving a hollow sleeve assembled with a first convex lens therein.

BACKGROUND OF THE INVENTION

In a conventional flash light, it consists of a holding body, a bulb, and a reflective concave. The reflective concave is disposed at an end of the holding body. The bulb is disposed in the central bottom of the reflective concave. With the beam directly emitted from the bulb and the beam reflected by the reflective concave, the conventional flash light conducts a function of illumination. Meanwhile, the conventional flash light can change the scope of illumination by adjusting the position of the bulb on reflective concave.

However, since the technology of light emitting diode (LED) has been rapidly developed. LED, which has the advantages of high brightness and low power consumption, has gradually been applied to replace conventional bulbs. However, when an LED is applied to a flash light, due to the small size of the LED and the necessary control of circuits and heat dissipation fins, it is difficult to dispose the LED protruding from the reflective concave and change the relative position between the LED and the reflective concave so as to adjust the illumination field. In order to solve this problem, the illumination field is commonly changed by omitting the structure of the reflective concave, disposing a convex lens in front of the LED, and adjusting the distance between the convex lens and the LED.

However, the afore-mentioned flash light can merely provide a function of illumination, which is not enough for the competitive market nowadays.

Meanwhile, a conventional projector, such as a slide projector, is disposed with a slide. The image of the slide is enlarged through the convex lens and is projected onto a screen. Therefore the slide is limited to be disposed between the focus length position and the twice focus length position with respect to the convex lens. If users want to combine the technique of a projector with the flash light by placing the slide in the afore-mentioned flash light, the illumination effect will be affected by the blocking of the slide. It is troublesome for the users if they want to have the illumination effect of a flash light by manually removing the slide from the flash light.

SUMMARY OF THE INVENTION

To improve the conventional problems, an object of the present invention is to provide an illumination device, which combines the functions of illumination and displaying a predetermined pattern together by means of moving a first convex lens with respect to an light emitting element and a transparent sheet, so as to make the projection facula projected onto the surface of a objective from present a light source pattern of the light emitting element with a first illumination value mainly for illumination to present the predetermined pattern of the transparent sheet with a second illumination value less than the first illumination mainly for displaying.

To achieve aforesaid objective, the present invention provides an illumination device, including an illumination body, an light emitting element, a transparent sheet, a hollow sleeve, and a first convex lens. The illumination body includes an illumination opening, and a container formed therein. The light emitting element is disposed in the container for generating a beam, and the beam projects onto a surface of an object for forming a projection facula. The transparent sheet is disposed in the container, and separated with the light emitting element in a predetermined distance. The transparent sheet includes a predetermined pattern and the overall length of the predetermined pattern is less than the diameter of the transparent sheet. The hollow sleeve movably covers the illumination body. The first convex lens is disposed in the hollow sleeve and has a focus length.

The light emitting element, the transparent sheet, and the first convex lens are arranged sequentially along a moving direction. The hollow sleeve is moved along the moving direction such that the first convex lens is moved with respect to the light emitting element and the transparent sheet, so as to make the projection facula generated from light beam projected from the light emitting element is changed from presenting the light source pattern with a first illumination value mainly for illumination to presenting the predetermined pattern with a second illumination value less than the first illumination value mainly for displaying. The first convex lens is movable within an allowable moving range that keeps the transparent sheet distanced from the first convex lens for zero to twice of the focus length of the first convex lens.

Based on the above, according to an illumination device of the present invention, the different effects, such as making the projection facula diffused, present the light source pattern mainly for illumination, and present the predetermined pattern mainly for displaying are generated by moving the hollow sleeve with respect to the illumination body. Compared with prior arts, an illumination of the present invention provides multiple functions of illumination, indication, and displaying pattern.

BRIEF DESCRIPTION OF THE DRAWINGS

The accompanying drawings are included to provide a further understanding of the present invention, and are incorporated in and constitute a part of this specification. The drawings illustrate embodiments of the invention and, together with the description, serve to explain the principals of the present invention.

FIG. 3, FIG. 4, FIG. 4A, FIG. 5, and FIG. 5A illustrate the imaging principles of lens in accordance with the first embodiment of the present invention;

DETAILED DESCRIPTION OF THE PREFERRED EMBODIMENTS

Figure 1:
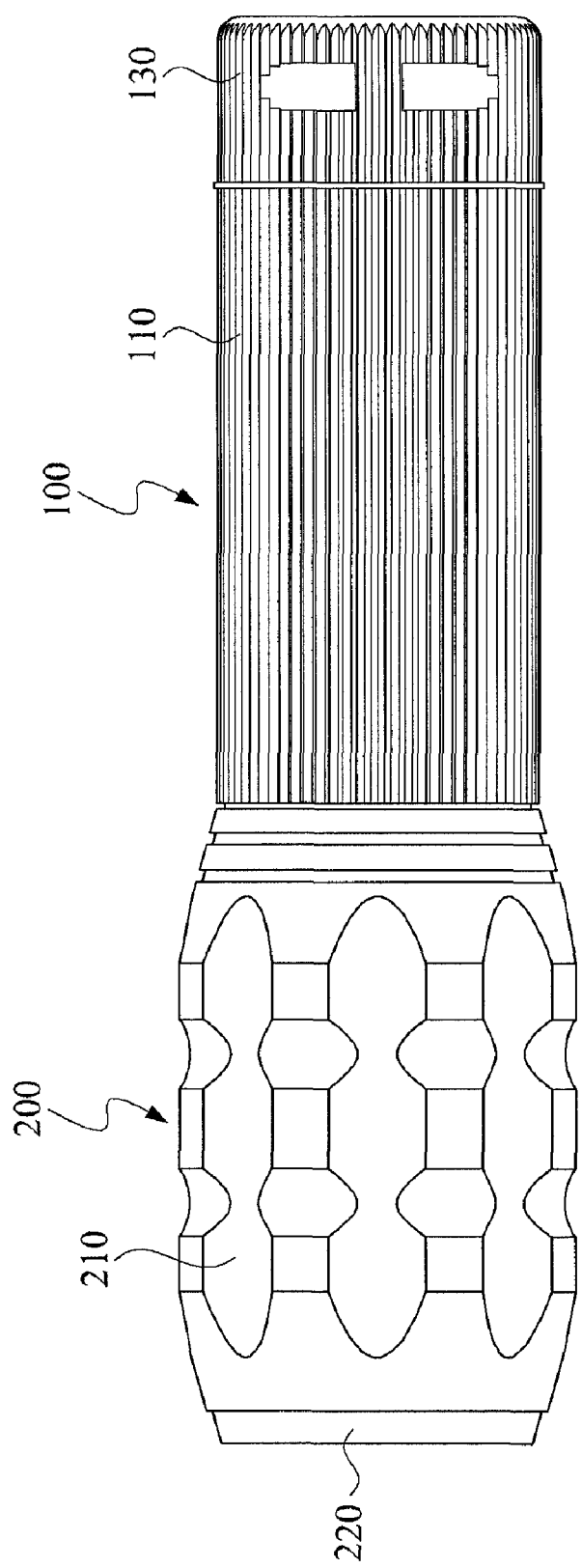
FIG. 1 is a side view of an illumination device in accordance with a first embodiment of the present invention.

Refer to FIG. 1, which is a side view of an illumination device in accordance with a first embodiment of the present invention. The illumination device 1 includes an illumination body 100 and a hollow sleeve 200. The effects of that makes a projection facula diffusing, and present different images of projection facula, are generated by moving the hollow sleeve 200 with respect to the illumination body 100. Four preferable embodiments of the present invention and three applications are described as follows. It is a common understanding for persons having ordinary skill in the art that four preferable embodiments and three applications are just the examples of the present invention, and they should not be the limitation the present invention.

Figure 2:
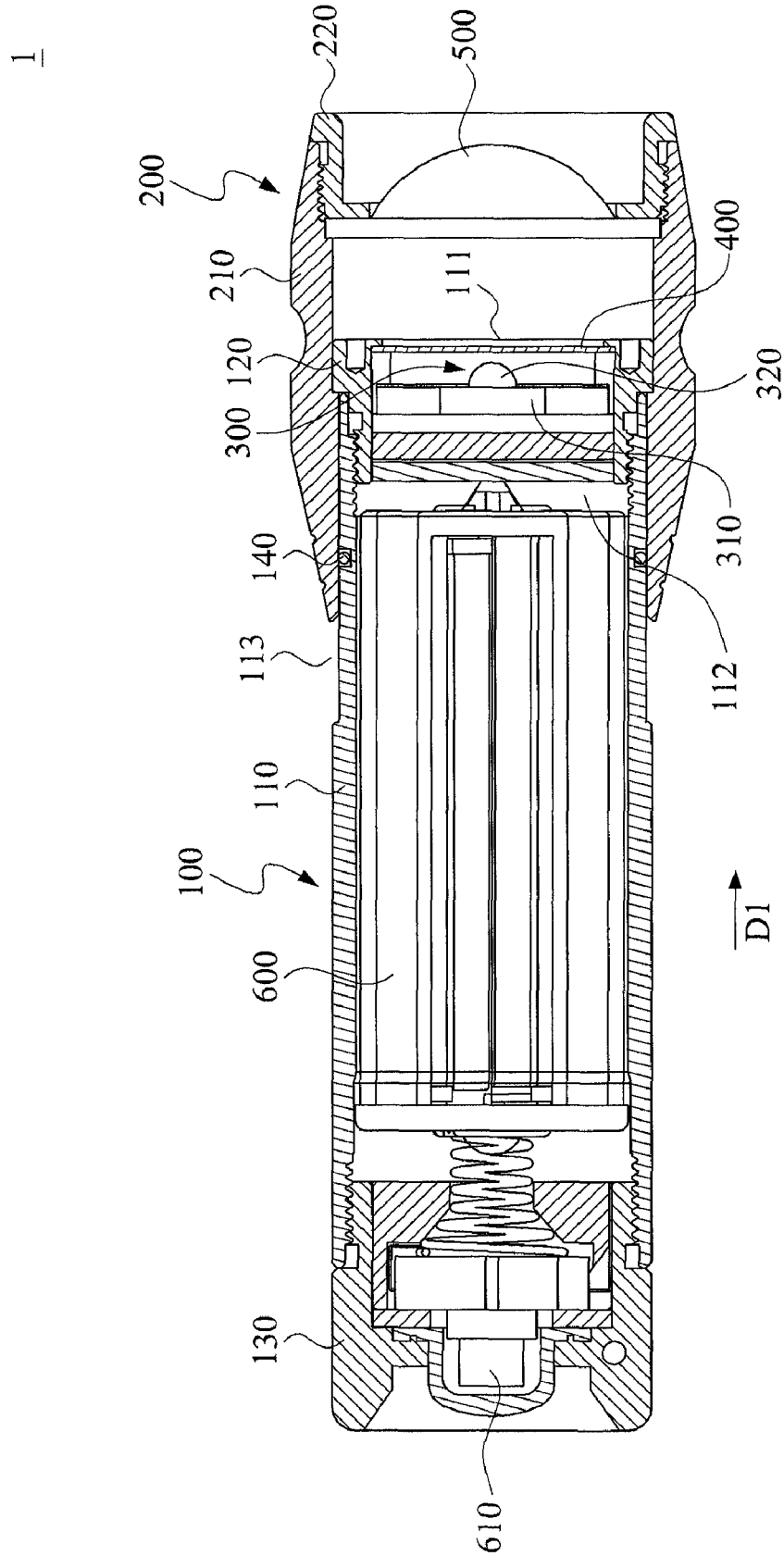
FIG. 2 is a cross-sectional view of the illumination device in accordance with the first embodiment of an illumination device of the present invention.
Figure 2A:
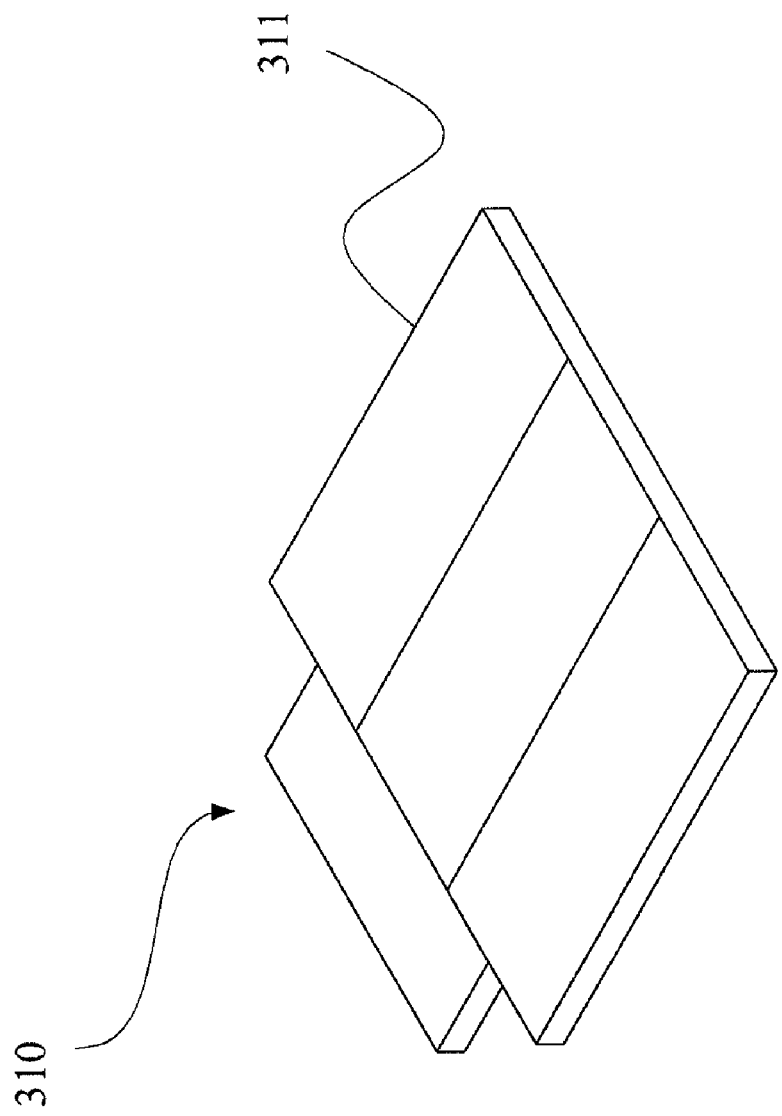
FIG. 2A is a perspective view of a light emitting element in accordance with the first embodiment of the present invention.
Figure 2B:
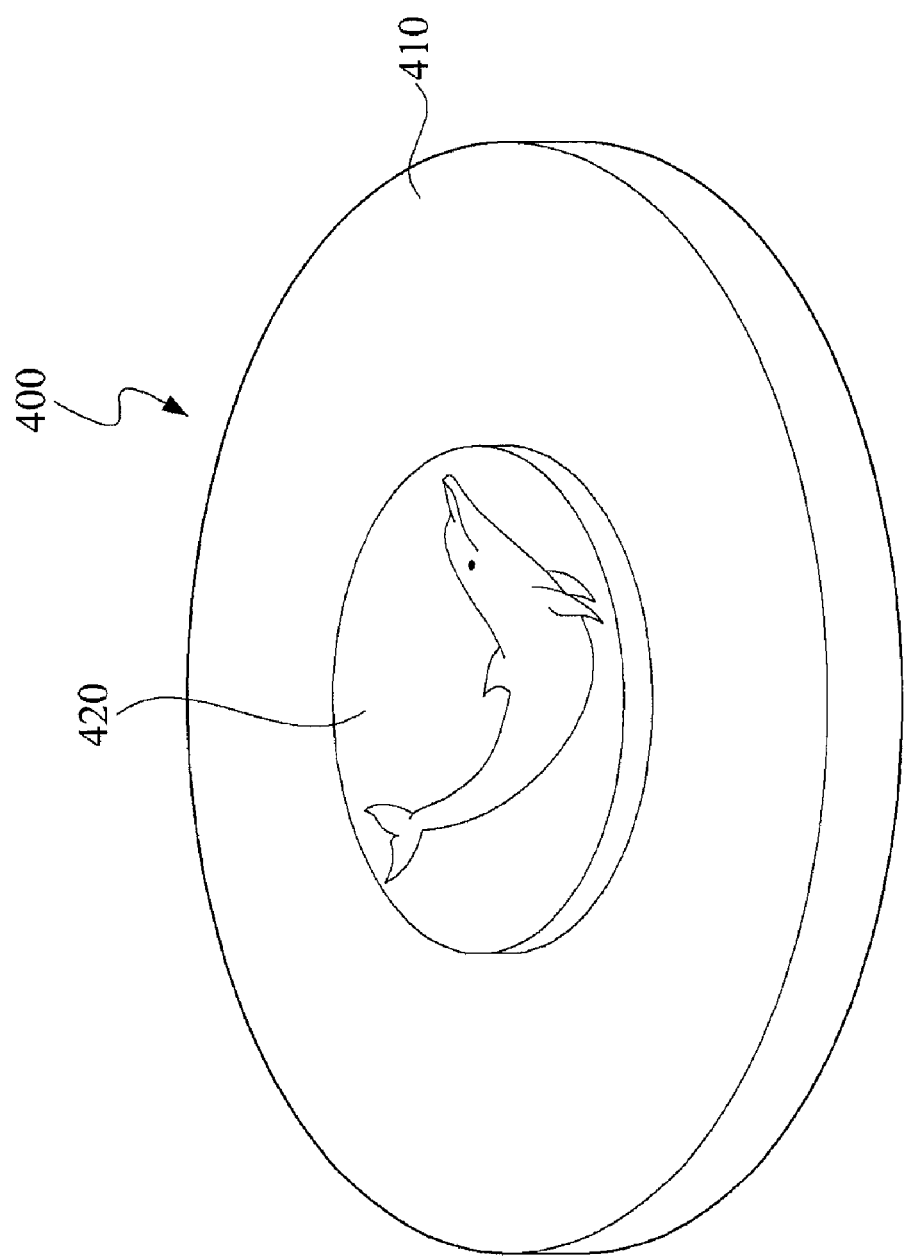
FIG. 2B is a perspective view of a transparent sheet in accordance with the first embodiment of the present invention.

Refer to FIG. 2, FIG. 2A and FIG. 2B. FIG. 2 is a cross-sectional view of the illumination device in accordance with the first embodiment of the present invention; FIG. 2A is a perspective view of a light emitting element in accordance with the first embodiment of the present invention; and FIG. 2B is a perspective view of a transparent sheet in accordance with the first embodiment of the present invention.

The illumination device 1 includes the illumination body 100, the hollow sleeve 200, an illumination assembly 300, a transparent sheet 400, a first convex lens 500, and a power module 600. The illumination body 100 is formed in a long cylindrical shape. An end of the illumination body 100 includes an illumination opening 111 and a sliding groove 113, and a container is inwardly formed from the illumination opening 111. The illumination body further includes an illumination housing 110, a first cap 120, a second cap 130, and a damper ring 140. The first cap 120 and the second cap 130 are disposed respectively in the front end and the rear end of the illumination housing 110, wherein the sliding groove is disposed at a side of the illumination housing 110. The first cap 120 is formed in a shape of a ring and the illumination opening 111 is located on the first cap 120. The damper ring 140 is formed in a shape of a ring and disposed in the sliding groove 113 between the illumination body 100 and the hollow sleeve 200 for providing a damping force between the illumination body 100 and the hollow sleeve 200, so as to prevent the illumination body 100 and the hollow sleeve 200 from easily sliding with each other.

The hollow sleeve 200 movably covers the illumination body 100. The hollow sleeve 200 includes a sleeve housing 210 and a lens cap 220. The inner side of the sleeve 200 is partially attached to the sliding groove 113 and is limited only to be movable within the sliding groove 113. The lens cap 220 is formed in a shape of a ring and assembled to the inner side of an end of the sleeve housing 210.

The illumination assembly 300 is disposed inside the container 112 and assembled with the first cap 120. The illumination assembly 300 includes an light emitting element 310 and a second convex lens 320. The light emitting element 310 has a light source pattern 311 (as shown in FIG. 2A), and can be composed of at least one light emitting diode (LED) for generating a beam. The beam projects onto a surface of an object 2 to form a projection facula. The second convex lens 320 is disposed nearby the light emitting element 310 and located between the LED and the transparent sheet 400, preferably, the second convex lens 320 can directly attach to the light emitting element 310 to encapsulate the light emitting element.

The transparent sheet 400 is disposed in the container 112 of the front end of the illumination housing 110, and separated with the light emitting element 310 in a predetermined distance. The transparent sheet 400 includes a transparent film 410 and a predetermined pattern 420. The predetermined pattern 420 can be a piece of sticker attached to the transparent film 410. The predetermined pattern 420 can also be printed on the transparent film 410. In another embodiment, there can be two transparent films making the predetermined pattern 420 be sandwiched therebetween.

The overall length of the predetermined pattern 420 is less than the diameter of the transparent sheet 400. For example, the length of the predetermined pattern 420 is less than four-fifths, three-fourths, two-thirds, or half of the diameter of the transparent sheet 400 so as to prevent the beam, which is projected from the light emitting element 310, from being blocked by the predetermined pattern 420, and further to ensure the function of illumination still being practicable.

The first convex lens 500 is disposed between the sleeve housing 210 and the lens cap 220 of the hollow sleeve 200, and has a focus length. According to the present embodiment, the first convex lens 500 is a plano-convex lens.

The power module 600 is disposed in the container 112 and electrically connected with the light emitting element 310, so as to supply the power to the light emitting element 310. According to the first embodiment, the illumination device 1 further includes a switch assembly 610. The switch assembly 610 is electrically connected with the power module 600. A battery is installed inside the power module 600 as the power.

Figure 3:
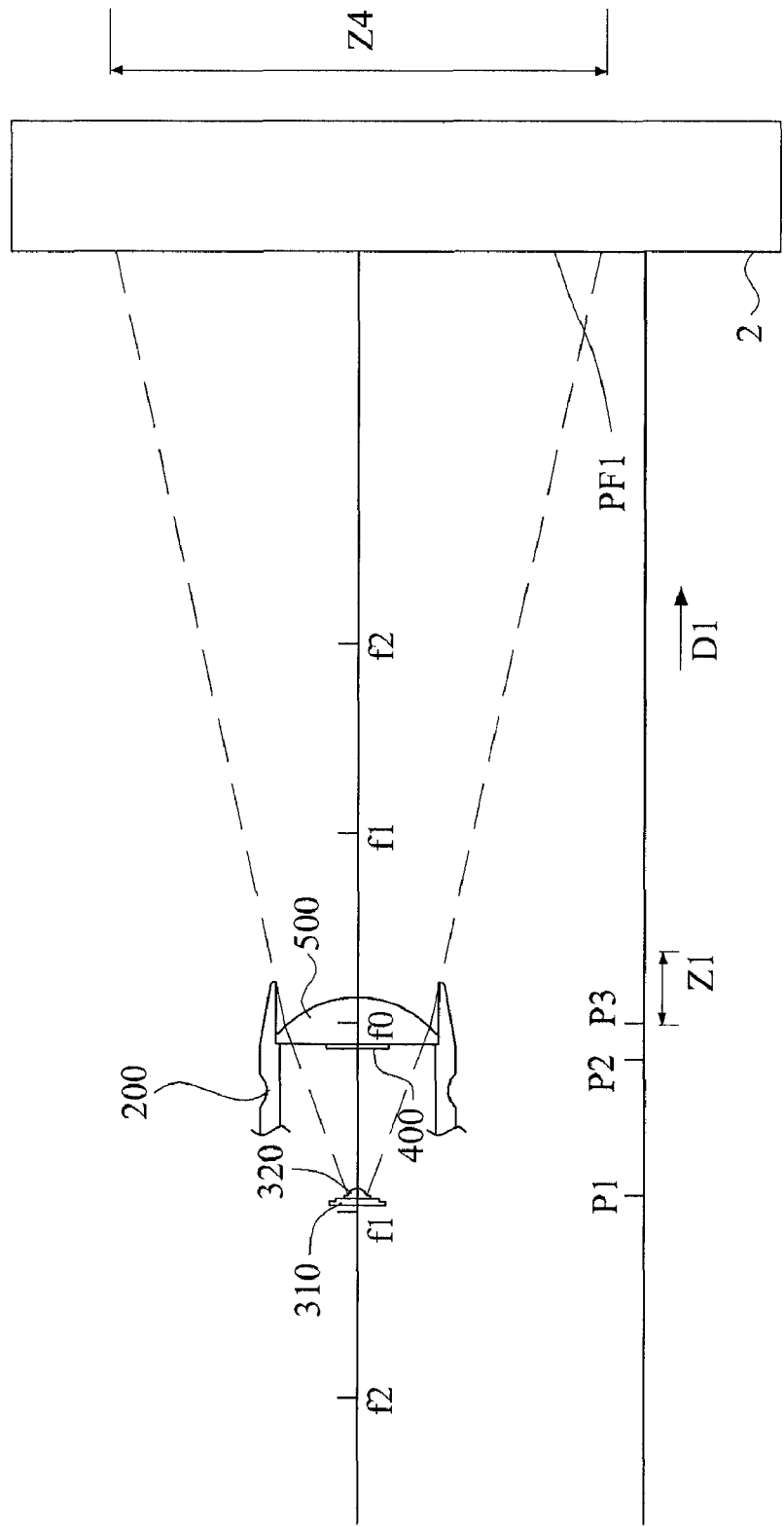
Figure 4:
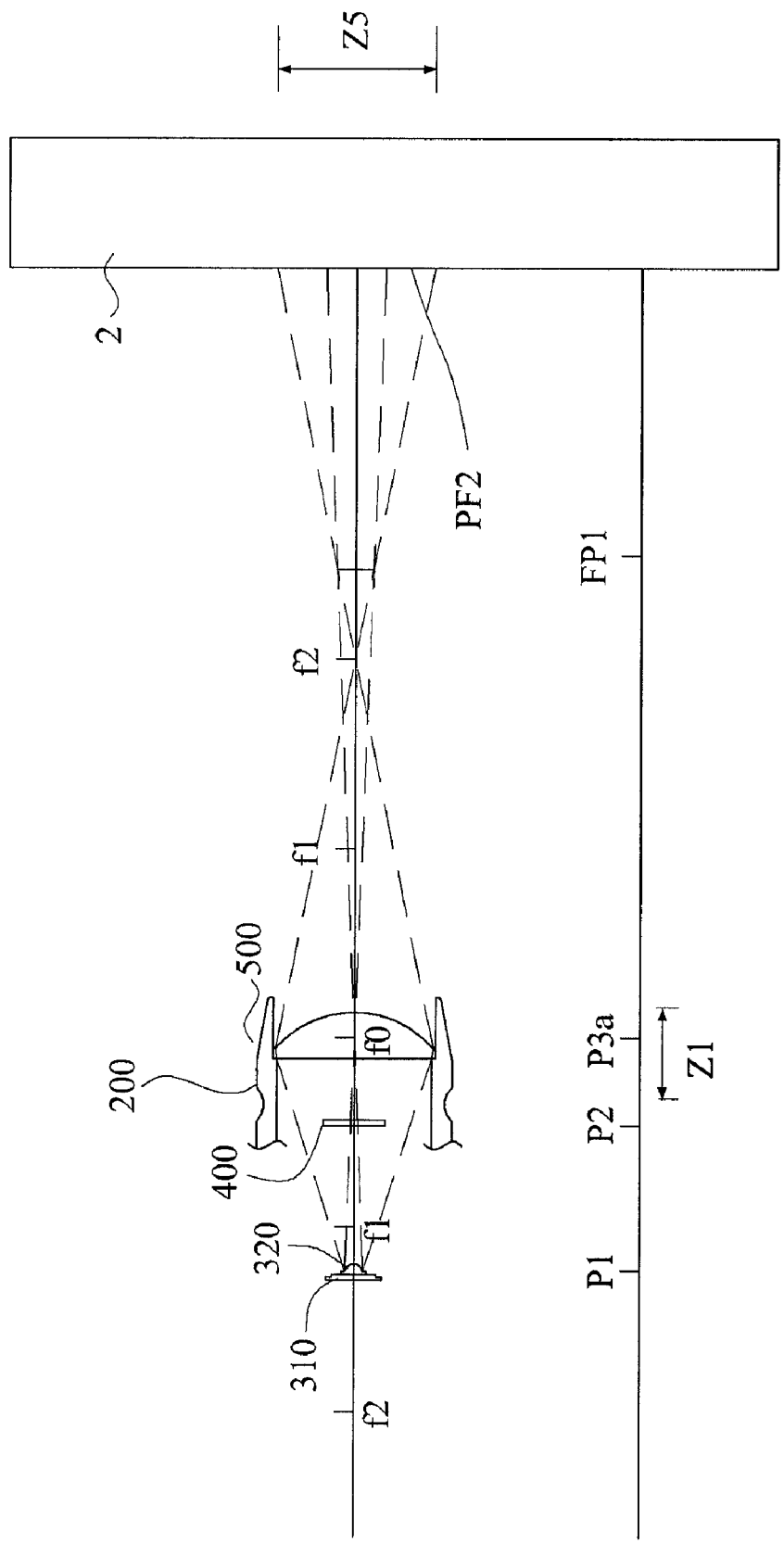
Figure 5:
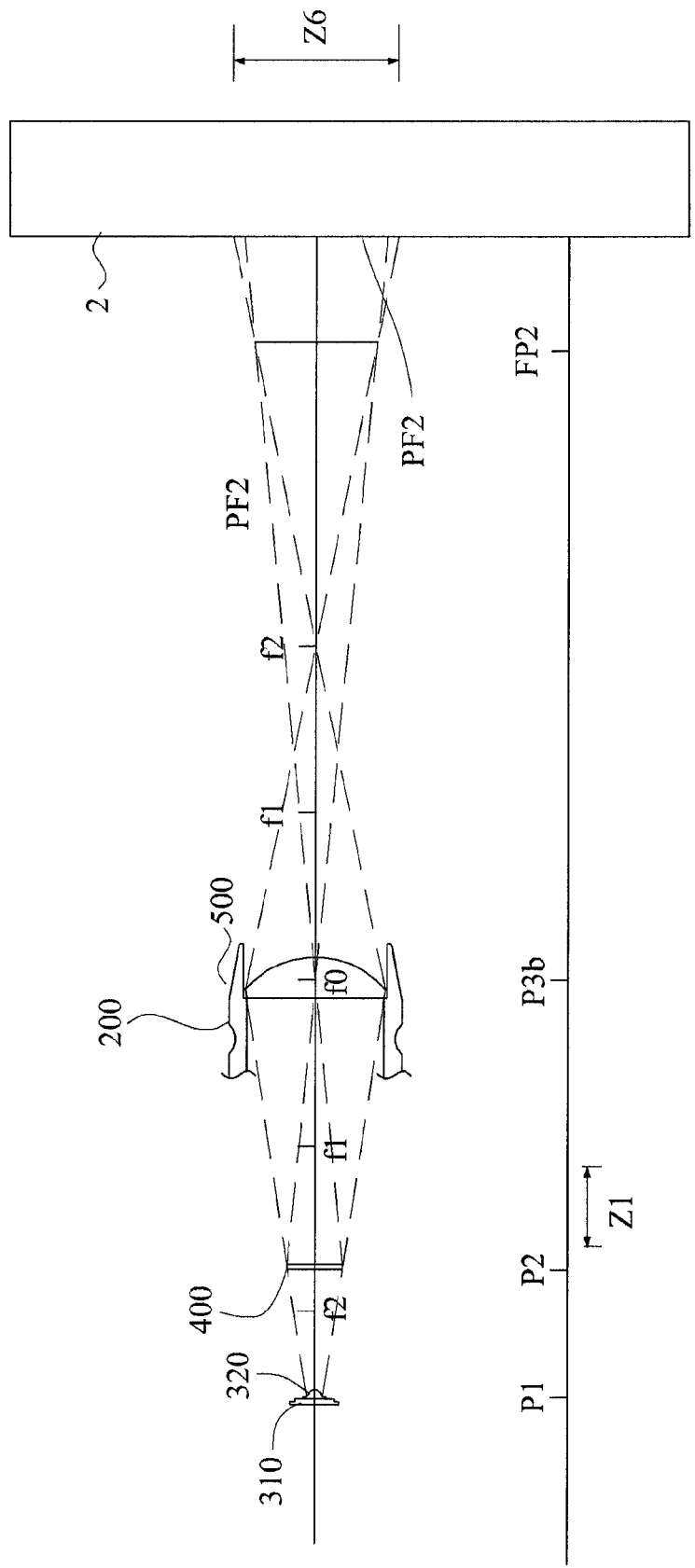

Refer to FIG. 3, FIG. 4, FIG. 4A, FIG. 5, and FIG. 5A, which illustrate the imaging principles of lens of the first embodiment of the present invention; and please simultaneously refer FIG. 1 and FIG. 2. It should be noted that FIG. 3, FIG. 4, and FIG. 5 are just provided for illustrating the imaging principle; thus, it is reasonable that a certain range of tolerance must exist in actual paths and ranges of beam. Meanwhile, parameters such as the size of the light emitting element 310 and the transparent sheet 400, and the curvature of the first convex lens 500 and the second convex 320 will affect the actual paths of beams. Therefore, persons skilled in the art can easily achieve the present invention according to the disclosure of imaging principles as presented in FIG. 3, FIG. 4 and FIG. 5.

The light emitting element 310, the transparent sheet 400, and the first convex lens 500 are sequentially arranged along a moving direction D1. Since the light emitting element 310 and the transparent sheet 400 are attached to the illumination housing 110 to make a distance therebetween be fixed, when the hollow sleeve 200 is operated to move along the moving direction D1 or along another moving direction opposite to the moving direction D1, the first convex lens 500 is moved with respect to the light emitting element 410 and the transparent sheet 400 such that the relative distance between the first convex lens 500 and the light emitting element 310 and the transparent sheet 400 is changeable.

As shown in FIG. 3, the light emitting element 310 is located in a first position P1, the transparent sheet 400 is located in a second position P2, and the first convex lens 500 is located in a third position P3. A zero focus length position f0, two focus length positions f1 and two twice focus length positions f2, which is changeable together with the convex lens 500, are presented in FIG. 3, FIG. 4 and FIG. 5, wherein the zero focus length position f0 is located in the convex lens 500, the focus length positions f1 are located in two opposite positions distanced form the convex lens 500 for focus length, and the twice focus length positions f2 are located in two opposite positions distanced form the convex length for focus length. When the hollow sleeve 200 is operated to move within an allowable moving range, the transparent sheet 400 is kept in being distanced from the first convex lens 500 for zero to twice of the focus length of the first convex lens 500.

The center points of the first convex lens 500, the light emitting element 310, and the transparent sheet 400 are arranged along the moving direction D1, wherein the beam emitted from the light emitting element 310 sequentially passes through the transparent sheet 400 and the first convex lens 500 and projects onto the surface of the object 2 through the first convex lens 500. According to the present embodiment, the object 2 is an object with a smooth and flat surface, such as a wall or a screen.

The illumination device 1 can be operated in three operation modes. When the hollow sleeve 200 is operated to move such that the first convex lens 500 is located within a first zone Z1 (e.g. as it is shown in the drawing, the first convex lens 500 is closed to the transparent sheet 400), the illumination device 1 is operated in a first mode. In the first operation mode, the light emitting element 310 and the transparent sheet 400 are both located within the focus length position f1. According to the imaging principle of a convex lens, after the beam passes through the first convex lens 500, it becomes a diffused light. The diffused light is projected to the surface of the object 2 so form a diffused projection facula presenting a diffused image PFO, which illuminates a first illumination field Z4. In the first operation mode, the illumination device 1 of the present invention can be served as a light-diffused type flash light or lamp for general illumination.

Moreover, when the first convex lens 500 is operated to gradually move along the moving direction D1 from the position presented in FIG. 3 to a first imaging position P3a, the beam is gradually concentrated to make the first illumination field of the projection facula is gradually reduced, and further to make the illumination value of the projection facula is simultaneously increased. Therefore, it is more convenient for users to adjust the area of the first illumination field and the illumination value of the projection facula through the present invention.

As shown in FIG. 4 and FIG. 4A, when the hollow sleeve 200 is continuously operated to move along the moving direction D1 to make the first convex lens 500 located in the first imaging position P3a, where the light emitting element 310 is located between the focus length position f1 and the twice focus length position f2 with respect to the first convex lens 500, the illumination device 1 is operated in a second operation mode. In the second operation mode, the transparent sheet 400 is located between the zero focus length position f0 and the focus length position f1 with respect to the first convex lens 500, and the projection facula illuminates a second illumination field Z5. According to the imaging principle of a convex lens, in the second operation mode, the projection facula presents a first projecting image PF1 which is a real, magnified, and inverted image with respect to the light source pattern 311 (as shown in FIG. 4A). In other words, the projection facula can present the light source pattern 311 under the second operation mode. The projection facula provides a first illumination value mainly for illumination, the beam is concentrated most, the second illumination field Z5 is less than the first illumination field Z4, and the first illumination value of the projection facula becomes the greatest. It is more important that in the second operation mode, the illumination device 1 can be served as a pointer mainly for illuminating or indicating a selected region. Moreover, the light source pattern of the light emitting element 310 can be adjusted from blur to clear by slightly moving the hollow sleeve 200, so that it can be applied to illustrate the imaging principle of a convex lens.

When the hollow sleeve 200 is operated to move along the moving direction D1 to make the first convex lens 500 move to a second imaging position P3b, the illumination device 1 is operated in a third operation mode. As shown in FIG. 5 and FIG. 5A, when the transparent sheet 400 is located between the focus length position f1 and the twice focus length position f2 of the first convex lens 500, and the light emitting element 310 is beyond the twice focus length position f2, the projection facula illuminates a third illumination field Z6. According to the imaging principle of a convex lens, in the third operation mode, the projection facula presents a second projecting image PF2, which is a real, magnified, and inverted image with respect to the predetermined pattern 420 of the transparent sheet 400 (as shown in FIG. 5A). In other words, the projection facula can present the predetermined pattern 420 under the third operation mode. The projection facula provides a second illumination value much less than aforesaid first illumination value, and the third illumination field Z6 is less than the first illumination field Z4. Due to that the second illumination value is much less than aforesaid first illumination value, in the third operation mode, the illumination device 1 is operated mainly for displaying the predetermined pattern.

Moreover, when the area of the predetermined pattern 420 of the transparent sheet 400 is greater than the light emitting element 310, and the transparent sheet 400 is very closed to the focus length position f1, the third illumination field is greater than the second illumination field. It implies that the predetermined pattern 420 of the transparent sheet 400 can be enlarged. In the present invention, it is more interesting if the user changes the function from illumination to displaying the image of the predetermined pattern 420 on the surface of the object 2. Meanwhile, it becomes more meaningful if the predetermined pattern 420 is a photograph of the user, a specific person or a place. Furthermore, if the predetermined pattern 420 is a logo or product of a company, through the achievement of the present invention, it also can be applied to the utilization of advertisement, and to further promote the sales volume of the product.

Figure 6:
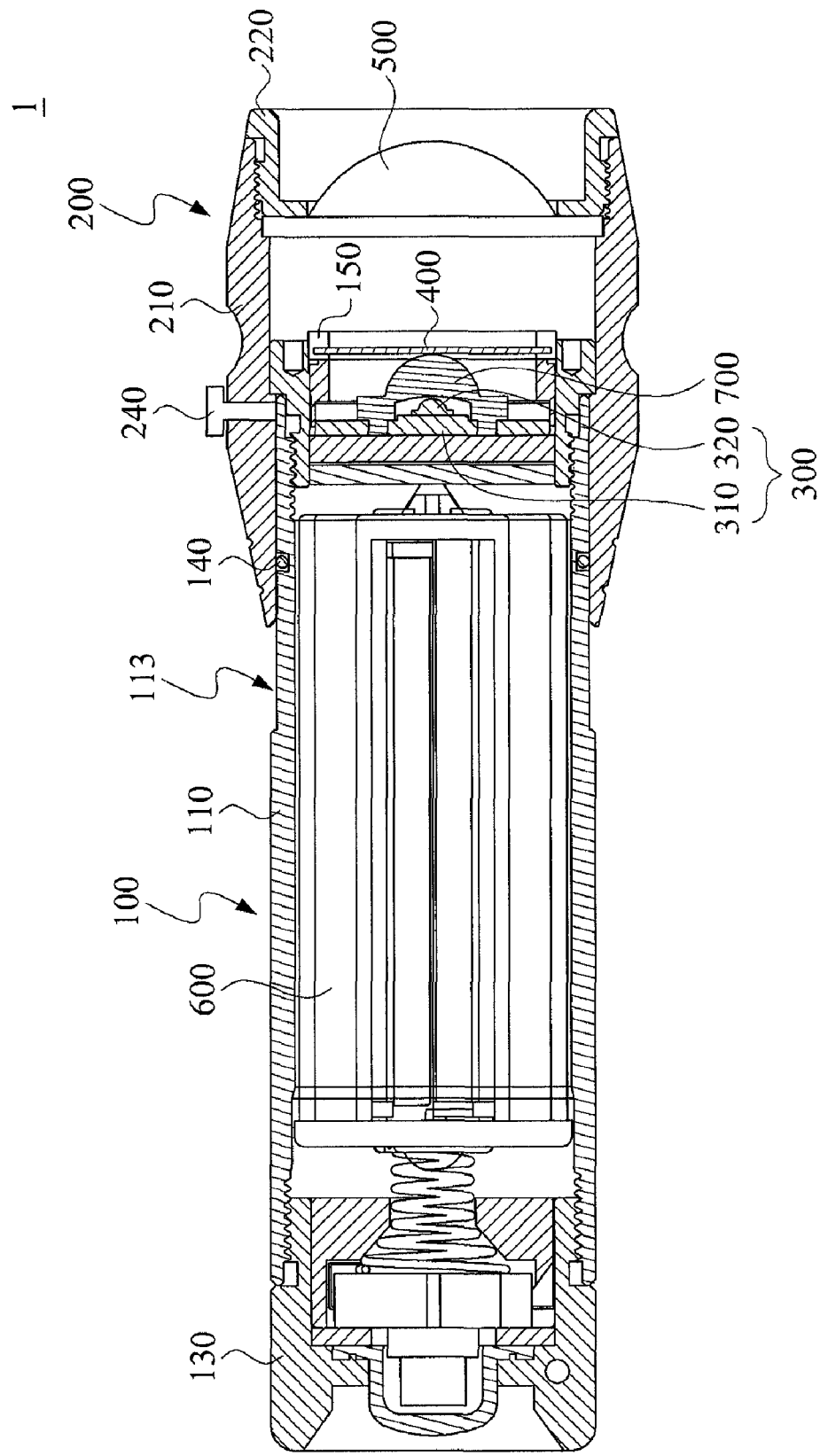
FIG. 6 is a cross-sectional view of an illumination device in accordance with a second embodiment of the present invention.

Refer to FIG. 6, which is a cross-sectional view of an illumination device in accordance with a second embodiment of the present invention. With difference from the first embodiment, in the second embodiment, the illumination device 1 further includes a third convex lens 700 installed in the container 112, and located between the light emitting element 310 and the transparent sheet 400. The third convex lends 700 is a concave-convex lens installed for further focusing the beam projected from the light emitting element 310.

The illumination body 100 further includes a replaceable element 150 installed in the illumination opening 111 of the illumination body 100, and the transparent sheet 400 is disposed in the replaceable element 150, so that the user can replace transparent sheet 400 by replacing the replaceable element 150.

The hollow sleeve 200 further includes a fastening element 240. The fastening element 240 can be a screw, and can be applied to penetrate the hollow sleeve 200. When the user intends to fix the illumination body 100 and the hollow sleeve 200 with each other, the user can fasten the fastening element 240 until the fixing element 240 is firmly contacted with the illumination body 100 so as to prevent the illumination body 100 and the hollow sleeve 200 from easily sliding with each other.

Figure 6A:
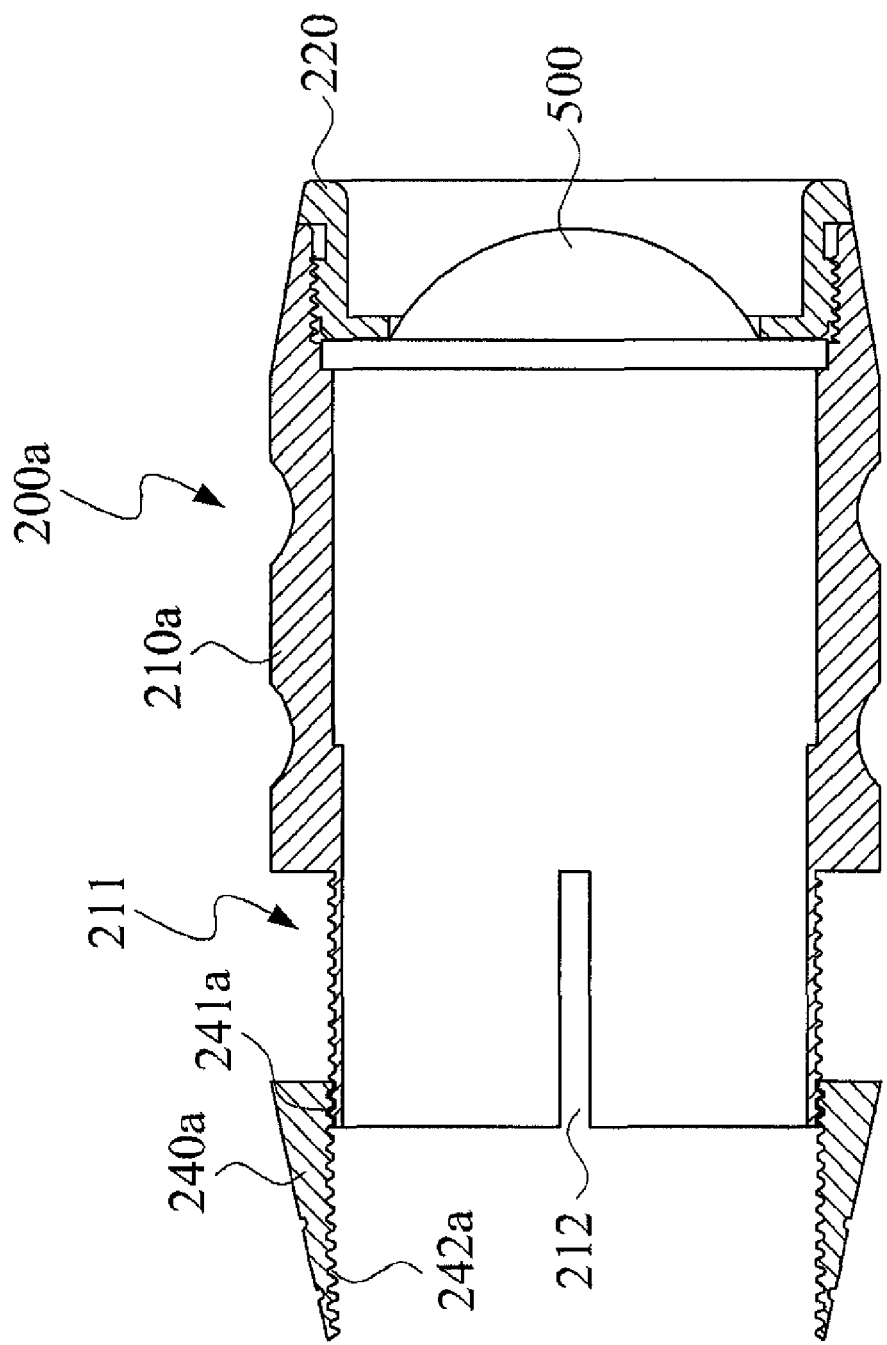
FIG. 6A is a partial cross-sectional view of an illumination device in accordance with a third embodiment of the present invention.
Figure 6B:
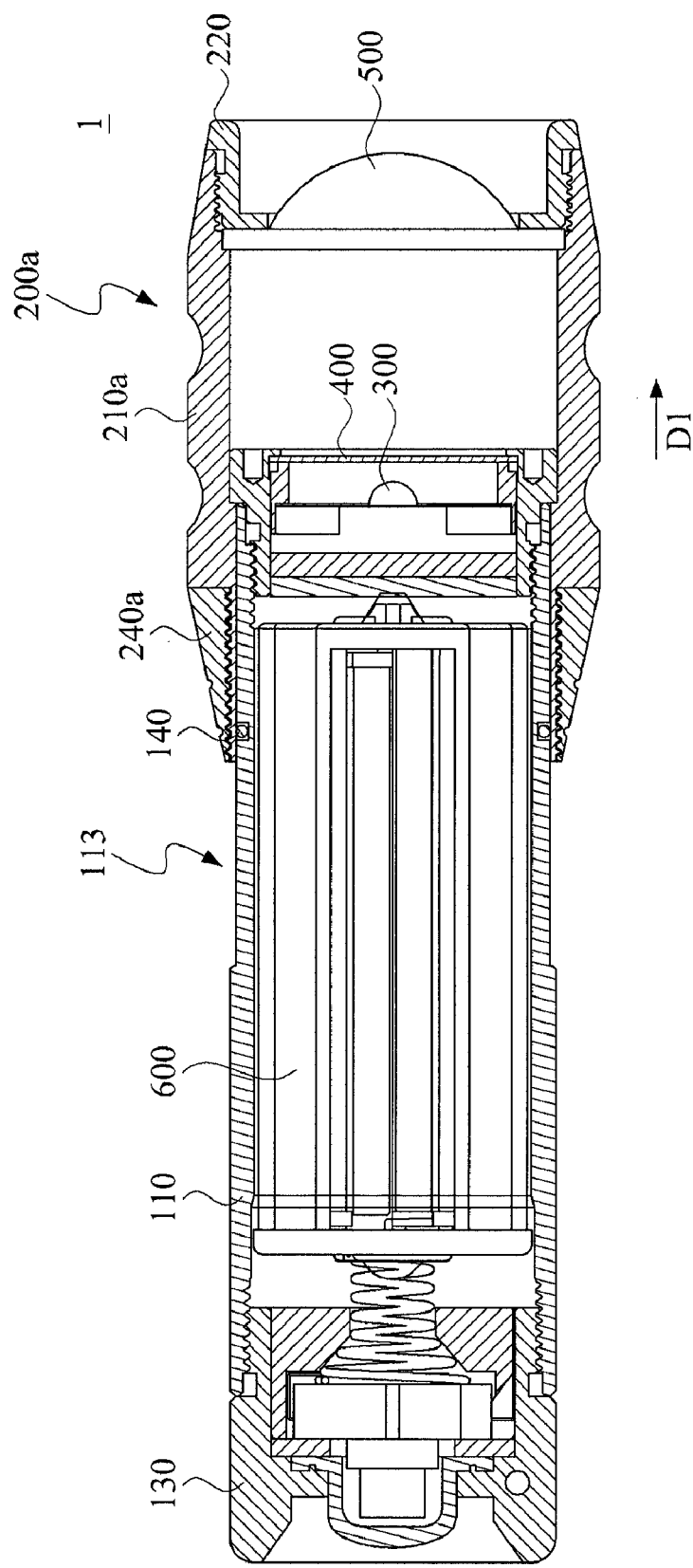
FIG. 6B is a cross-sectional view of the illumination device in accordance with the third embodiment of the present invention.

Refer to FIG. 6A and FIG. 6B. FIG. 6A is a partial cross-sectional view of an illumination device in accordance with a third embodiment of the present invention; and FIG. 6B is a cross-sectional view of illumination device in accordance with the third embodiment of the present invention. A hollow sleeve 200a further includes a fastening element 240a. A sleeve housing 210a includes a fastening groove 211 and an adjustment groove 212. The fixing element 240a is formed in a shape of a ring. The fastening element 240a includes a wide part 241a and a narrow part 242a. Compared with the narrow part 242a, the wide part 241a is closer to the first convex lens 500. The radius of the wide part 241a is greater than that of the narrow part 242a. When the fastening element 240a is fastened to the fastening groove 211 gradually through the wide part 241a along the moving direction D1, the adjustment groove 212 is gradually narrowed. That is, the fastening element 240a forces the hollow sleeve 200a to apply a force onto the illumination body 100, so as to prevent the hollow sleeve 200a and the illumination body 100 from easily sliding with each other.

Figure 7:
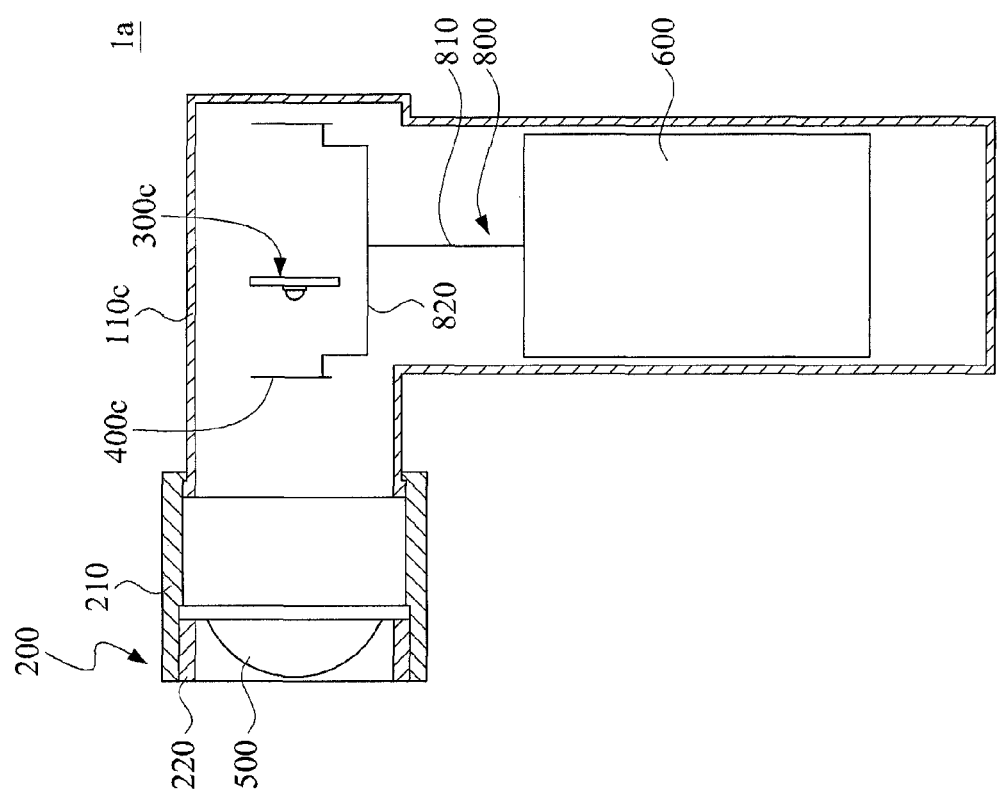
FIG. 7 is a schematic side view of an illumination device in accordance with a forth embodiment of the present invention.
Figure 8:
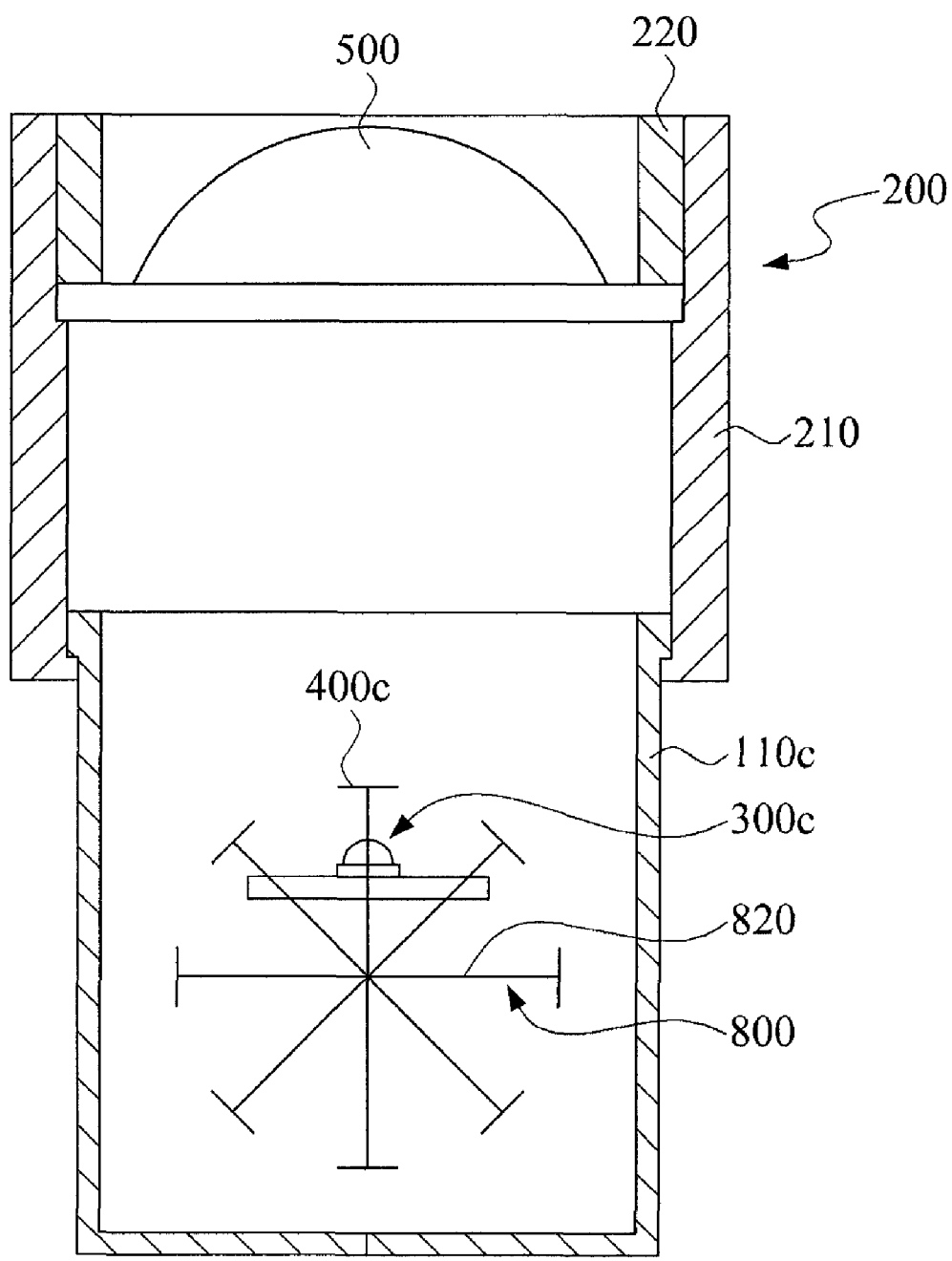
FIG. 8 is a top view of the illumination device in accordance with a forth embodiment of the present invention.

Refer to FIG. 7 and FIG. 8. FIG. 7 is a side view of an illumination device in accordance with a forth embodiment of the present invention; and FIG. 8 is a top view of the illumination device in accordance with the forth embodiment of the present invention. An illumination housing 100c of an illumination device 1a includes a rotatable mechanism 800 including a rotatable rack 810 and a supporting rod 820. The rotatable rack 810 is pivotally jointed to the supporting rod 820, so as to be rotatable with respect to the supporting rod 820. A plurality of transparent sheets 400c are assembled into one end of the rotatable rack 810, and arranged along a circular path. By rotating the rotatable rack 810, the transparent sheets 400 located between the light emitting element 310 and the first convex lens 500 can changed in turns, so that the projection facula can display different images.

Figure 9:
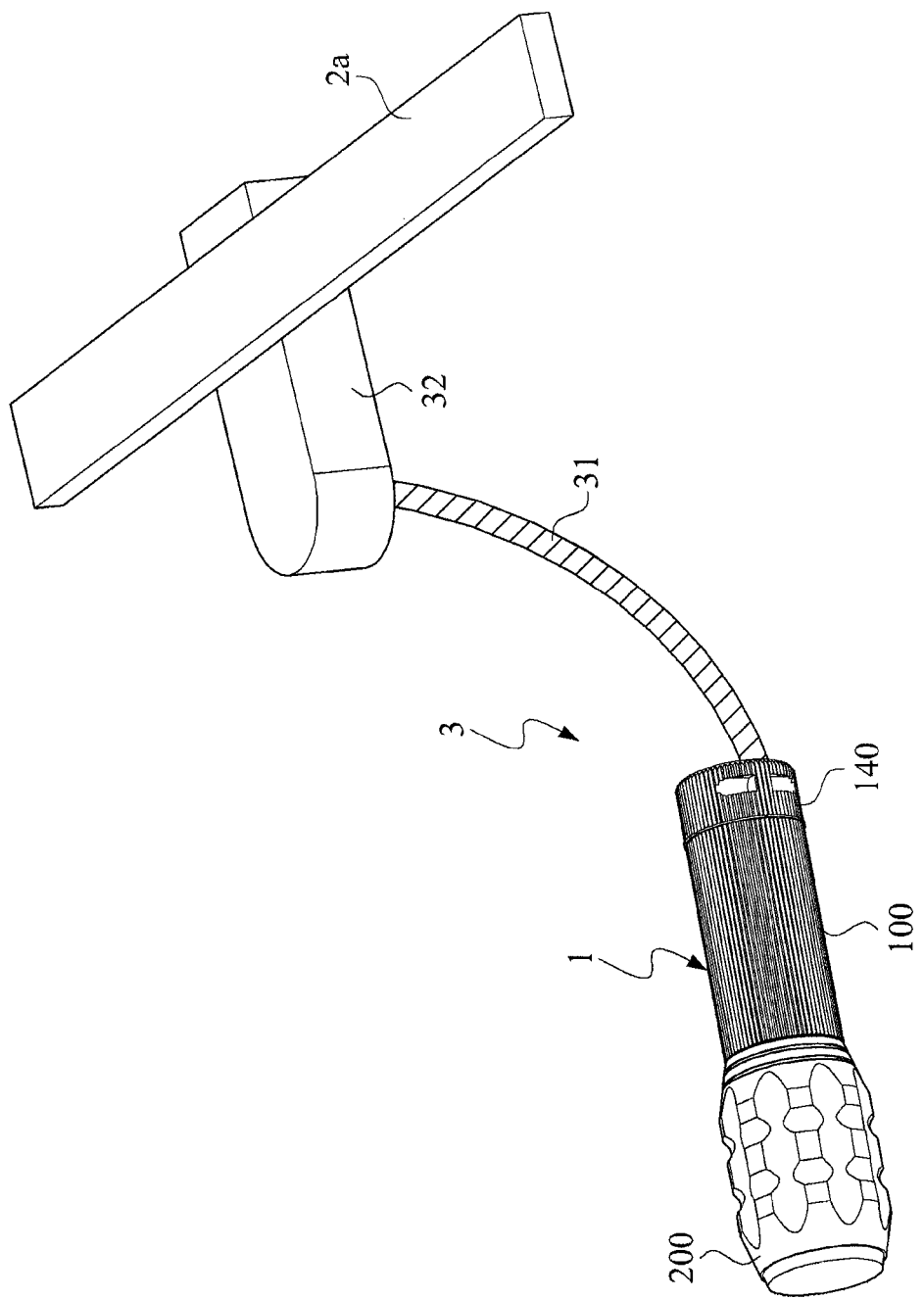
FIG. 9 illustrates a first application of the illumination device in accordance with the present invention.

Refer to FIG. 9, which illustrates a first application of the illumination device in accordance with the present invention. In the first application, the illumination device 1 is applied to a lamp 3, which includes the illumination device 1, a flexible tube 31, and a fixture 32. The flexible tube 31 connects the illumination device 1 and the fixture 32. The fixture 32 is connected to a power for supplying power to the illumination device 1 through circuits arranged in the flexible tube 31. The fixture 32 is secured on an object 2a. In the first application, users can mount the lamp 3 on a wall or other furniture and change the illumination direction of the illumination device 1 by adjusting the flexible tube 31. Thus, the present invention provides various illumination statuses.

Figure 10:
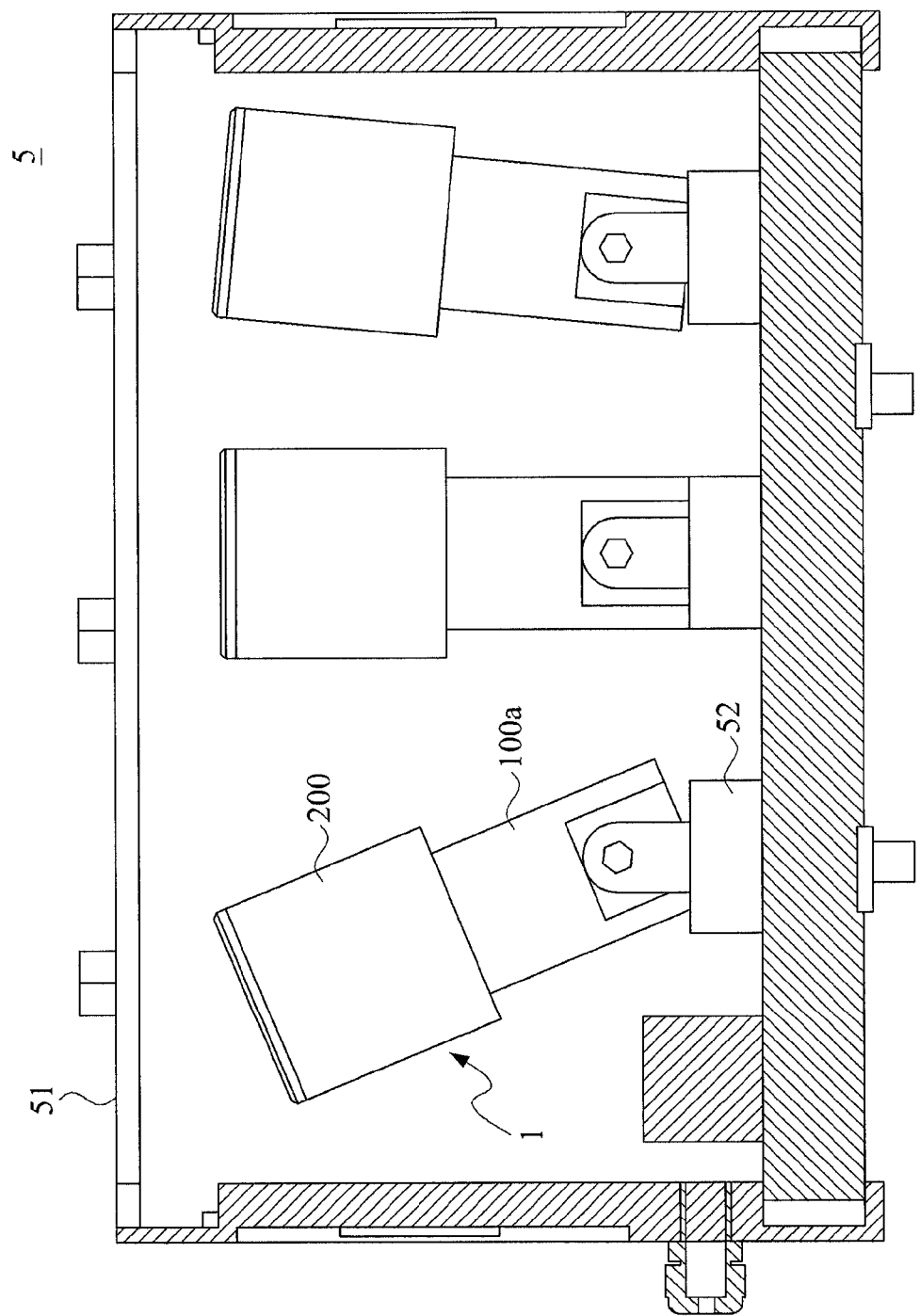
FIG. 10 illustrates a second application of the illumination devices in accordance with the present invention.

Refer to FIG. 10, which illustrates a cross-sectional view of a second application of the illumination devices in accordance with the present invention. FIG. 10 discloses a multi-source illumination device 5 including a lamp case 51, a pivot element 52, and a plurality of aforesaid illumination devices 1. The pivot element 52 is arranged in the bottom inside the lamp case 51 and the illumination devices 1 are pivotally jointed to the pivot element 52. In the second application, users can change the illumination direction by adjusting the illumination devices 1 so that the lamp case 51 can provide various illumination effects. The multi-source illumination device further includes a control mechanism (not shown). The control mechanism automatically controls the illumination direction of the illumination devices 1 and further controls the relative position of the hollow sleeve 200 and the illumination body 100a for each illumination device 1. As a result, the lamp case 51 can be applied to provide various stage effects.

Figure 11:
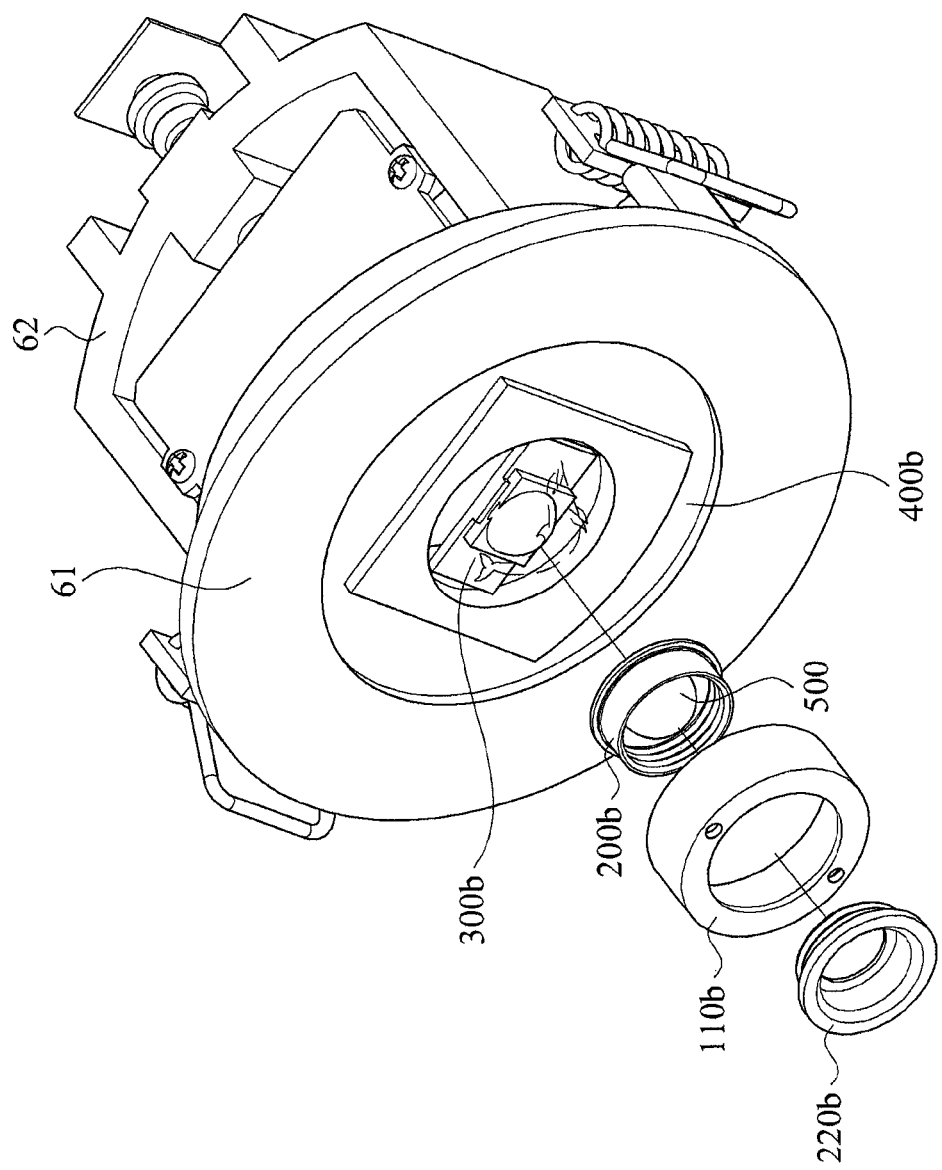
FIG. 11 is a third application of the illumination device in accordance with the present invention.

Refer to FIG. 11, which illustrates a third application of the illumination device in accordance with the present invention. FIG. 11 discloses an illumination lamp 6 having a light cup structure 61. The illumination lamp 6 includes the light cup structure 61 and an adjustment rack 62. An illumination housing 110b, a hollow sleeve 200b, a lens cap 220b, an illumination assembly 300b and a transparent sheet 400b of the present invention are all disposed inside the light cup structure 61. With difference to the first embodiment, in the third application, the power module 600 can be omitted, and the illumination housing 110b covers the outside portion of the hollow sleeve 200b.

Based on the above description, the illumination device in accordance with the present invention not only can perform general the function providing the diffused projection facula, but also can perform the advanced function of concentrated illumination and displaying the predetermined pattern by moving the hollow sleeve with respect to the illumination body. Compared with prior arts, an illumination of the present invention provides more multiple functions of illumination, indication, imaging, etc.

Although the present invention has been described with reference to the preferred embodiments thereof, it is apparent to those skilled in the art that a variety of modifications and changes may be made without departing from the scope of the present invention which is intended to be defined by the appended claims.

What is claimed is:
1. An illumination device, comprising:
an illumination body, having an illumination opening with a container formed therein;
a light emitting element, having a light source pattern mainly for illumination and disposed in the container, for generating a beam projecting onto a surface of an object and forming a projection facula on the surface;
a transparent sheet, having a predetermined pattern mainly for displaying and disposed in the container, and separated with the light emitting element in a predetermined distance;
a hollow sleeve, movably covering the illumination body; and
a first convex lens, disposed in the hollow sleeve and having a focus length;
wherein the light emitting element, the transparent sheet, and the first convex lens are sequentially arranged along a moving direction;
when the hollow sleeve is moved along the moving direction, the first convex lens is simultaneously moved to make the projection facula from present the light source pattern with a first illumination value to present the predetermined pattern with a second illumination value less than the first illumination value, and the first convex lens is movable within an allowable moving range that keeps the transparent sheet distanced from the first convex lens for zero to twice of the focus length of the first convex lens;

wherein a first zone, a first imaging position and a second imaging position are sequentially located along the moving direction; when the first convex lens is moved within the first zone, the projection facula illuminating a first illumination field; when the first convex lens is moved to the first imaging position, the projection facula illuminates a second illumination field; when the first convex lens is moved to the second imaging position, the projection facula illuminates a third illumination field; the first illumination field is greater than the second illumination field; and the first illumination field is also greater than the third illumination field.

2. The illumination device according to claim 1, wherein the beam sequentially passes through the transparent sheet and the first convex lens.

3. The illumination device according to claim 1, wherein the motion of the hollow sleeve along the moving direction makes the first convex lens simultaneously moves to sequentially make the projection facula diffusing, presenting the light source pattern, and presenting the predetermined pattern.

4. The illumination device according to claim 1, wherein the third illumination field is greater than the second illumination field.

5. The illumination device according to claim 1, wherein the light emitting element is composed of at least one light emitting diode (LED).

6. The illumination device according to claim 1, further comprising a second convex lens disposed nearby the light emitting diode, and located between the light emitting element and the transparent sheet.

7. The illumination device according to claim 1, further comprising a third convex lens disposed between the light emitting element and the transparent sheet.

8. The illumination device according to claim 1, further comprising a damper ring disposed between the illumination body and the hollow sleeve for providing a damping force between the illumination body and the hollow sleeve.

9. The illumination device according to claim 1, further comprising a replaceable element installed in the illumination opening of the illumination body for the transparent sheet disposed therein.

10. The illumination device according to claim 1, further comprising a rotatable mechanism disposed in the container of the illumination body, provided for assembling a plurality of said transparent sheets, such that the transparent sheets located between the light emitting element and the first convex lens are changed in turns when the rotatable mechanism is rotated.

11. The illumination device according to claim 10, wherein the rotatable mechanism includes a rotatable rack and a supporting rod, the rotatable rack is pivotally jointed to the supporting rod, the transparent sheets are assembled into the rotatable rack and arranged along a circular path, and the supporting rod is pivotally jointed to the illumination body.

* * * * *